United States Patent
Spetzler et al.

(10) Patent No.: US 7,929,205 B2
(45) Date of Patent: Apr. 19, 2011

(54) MOUTH SWITCH ARRANGEMENT AND MICROSCOPY SYSTEM HAVING A MOUTH SWITCH

(75) Inventors: Robert F. Spetzler, Paradise Valley, AZ (US); Hans-Joachim Miesner, Aalen (DE); Frank Rudolph, Aalen (DE)

(73) Assignee: Carl Zeiss Surgical GmbH, Oberkochen (DE)

( * ) Notice: Subject to any disclaimer, the term of this patent is extended or adjusted under 35 U.S.C. 154(b) by 972 days.

(21) Appl. No.: 11/588,125

(22) Filed: Oct. 26, 2006

(65) Prior Publication Data
US 2007/0165302 A1 Jul. 19, 2007

Related U.S. Application Data

(60) Provisional application No. 60/731,771, filed on Oct. 31, 2005.

(51) Int. Cl.
*G02B 21/00* (2006.01)
(52) U.S. Cl. ........................................ 359/368; 359/375
(58) Field of Classification Search .......... 359/368–390, 359/896
See application file for complete search history.

(56) References Cited

U.S. PATENT DOCUMENTS

| 3,887,267 | A | 6/1975 | Heller | |
|---|---|---|---|---|
| 7,075,715 | B2 | 7/2006 | Muller et al. | |
| 2002/0148462 | A1* | 10/2002 | Fugelsang et al. | 128/200.14 |
| 2004/0090668 | A1* | 5/2004 | Muller et al. | 359/368 |
| 2007/0206274 | A1* | 9/2007 | Nakamura | 359/379 |

FOREIGN PATENT DOCUMENTS

| CA | 957355 | 11/1974 | |
|---|---|---|---|
| CH | 526 069 | 9/1972 | |
| DE | 24 18 565 | 2/1976 | |
| DE | 102 32 688 | 2/2004 | |
| JP | 2005-304555 | * 11/2005 | 359/368 |
| WO | WO 2005/099609 A1 | 10/2005 | |

* cited by examiner

*Primary Examiner* — Thong Nguyen
(74) *Attorney, Agent, or Firm* — Potomac Patent Group PLLC

(57) ABSTRACT

A microscopy assembly comprises a stand, a stereo microscope supported by the stand, and a mouth switch assembly mounted to a holder, the mouth switch assembly including a mouth piece grippable by a user's teeth, and with a force sensor actuatable by the exertion of pressure by a user's lip while the mouth piece is held by the user's teeth, the force sensor including an actuating element arranged at a side of the mouth piece, wherein an actuating area of the actuating element located next to a front end of the mouth piece is spaced apart from the front end of the mouth piece by a distance larger than 4 mm and smaller than 35 mm.

16 Claims, 7 Drawing Sheets

MOUTH SWITCH ARRANGEMENT AND MICROSCOPY SYSTEM HAVING A MOUTH SWITCH

BACKGROUND OF THE INVENTION

1. Field of the Invention

The invention relates to a mouth switch assembly for mounting on a device and to be actuated by a user of the device with the user's mouth.

By use of a mouth switch, actuations of the device may be initiated with the mouth, which would otherwise be actuated perhaps by a hand switch, by a hand key or a foot switch. Using a mouth switch is advantageous in particular wherever the user has no hand free to carry out the desired actuation by hand.

In particular, the mouth switch assembly is intended for use on an optical device, in particular a microscope, and more particularly an operation microscope.

2. Brief Description of Related Art

A mouth switch assembly is known e.g. from published German patent application DE 102 32 688 A1, which is herewith incorporated in full by reference. The mouth switch assembly described therein is mounted on a microscope assembly comprising an operation microscope. The microscope assembly comprises a stand with joints hinged together, wherein the relative motion of the joints with respect to one another may be blocked or set free by suitable actuation of joint brakes. The mouth switch assembly arranged in the vicinity of an ocular lens of the operation microscope includes a pair of mouth pieces capable of being grasped by the teeth of a user, and a switch which is actuatable by biting and releasing the bite of the teeth grasping the pair of mouth pieces, wherein the switch is connected, via a controller, with the joint brakes. The joint brakes are configured to block the relative motion of the joints with respect to one another. Biting on the pair of mouth pieces results in setting free the joint brakes, so that the stand joints may be moved with respect to one another, and releasing the bite results in the joint brakes blocking again the movement of the stand joints with respect to one another. The user is thereby enabled to carry out his work, e.g. a surgical treatment, while observing the work field through the operation microscope. Whenever there is a need to change the view onto the work field or to view a different work field, the user bites on the pair of mouth pieces and thus enacts a release of the joint brakes. Then, the user can, while continuously viewing through the ocular and keeping both hands in the work field, change the position and/or orientation of the operation microscope by moving around in space as desired the mouth piece firmly held between his teeth. When the desired view of the work field is reached, the user releases the grip with his teeth on the pair of mouth pieces and enacts in this manner, that the joint brakes again block the motion of the stand joints with respect to one another, so that the new view onto the work field is fixed.

It has been found, however, that in the described use the user oftentimes does not manage to precisely fix the desired view of the work field. Subsequent repeated actuation of the mouth switch and re-positioning of the microscope is then necessary, which is tedious and cumbersome.

SUMMARY OF THE INVENTION

The present invention has been accomplished taking the above problems into consideration.

Accordingly, it is an object of the present invention to suggest a mouth switch assembly enabling easier actuation of a device.

Herein, the invention sets out from a mouth switch assembly with a support for mounting the mouth switch assembly to a base, a mouth piece mounted to the support which mouth piece is grippable by the user's teeth, and a force sensor which is actuatable with a user's lip by the application of pressure while the mouth piece is gripped with the teeth, wherein the force sensor includes an actuating element arranged at a side of the mouth piece.

The actuating element in particular has an actuator part next to a front end of the mouth piece, which actuator part is spaced apart from the front end of the mouth piece.

The invention is based on the idea that different actuating operations of a device be enabled separately via one mouth switch assembly by the mouth of one and the same user. By pressing together his lips, the user carries out one actuating operation, after having grasped the mouth switch assembly with his mouth, and the user is thereby enabled to simultaneously or separately move the mouth piece held with his teeth, so that he can move about in space the device rigidly connected to the mouth piece, or a part of the device rigidly connected to the mouth piece.

Preferably, the distance of the actuating part arranged next to the front end of the mouth piece from the front end of the mouth piece is larger than 4 mm and smaller than 35 mm, more preferably is larger than 5 mm and smaller than 20 mm, still more preferably is about 7 mm.

The mouth piece has a flat shape, so that it can be grasped and manipulated easily by the user's mouth. To this end, the mouth piece preferably has a largest diameter of less than 40 mm, preferably less than 30 mm in an area between the front end and an actuating part arranged next to the front end. Moreover, the mouth piece preferably has a circumference in the area between the front end and the actuating part arranged next to the front end of less than 90 mm, particularly less than 80 mm.

For secure actuation of the mouth switch assembly, in a preferred embodiment there may be provided a beaded rim protruding from a side of the mouth piece at the front end thereof. Therewith, e.g. drawing the mouth switch assembly towards the user can be made easier Further, a notch extending transversely to the longitudinal extension direction of the mouth piece may be provided at the front end thereof. Into this notch, the user's teeth can engage so that the user is enabled to even more securely actuate the device. In particular, a pushing movement away from the user is then more securely possible.

Further, the actuating element is preferably elastically displaceable from a rest position relative to the mouth piece. For example, the force sensor comprises a spring arranged for elastically holding the actuator element in its rest position. Herein, the actuator element is e.g. a pivoting lever pivotable with respect to the mouth piece. Preferably, a pivoting axis of the pivoting lever extends substantially perpendicularly to the longitudinal extension direction of the mouth piece.

In this case, the force sensor e.g. comprises an electrical switch actuated by the pivoting lever.

In another preferred embodiment, the actuating element is connected to the mouth piece, in particular is connected directly thereto. The actuating element in this case preferably comprises a sensor extending less than 10 mm in the extension direction of the mouth piece. The sensor preferably is a push-button, but may as well be a piezoelectric sensor, a thermal sensor or some other touch or contact switch. Advantageously, the actuating element may be realized as a lever movable in plural directions by the user's lip, which lever may actuate different electrical signal levels in an associated circuit according to the respective actuating direction.

A preferred use of the mouth switch assembly is one including mounting same on a microscopy assembly. Such a microscopy assembly comprises a stand with a base, a microscopy optics secured to the stand such as to be displaceable relative to the base, by means of joints movable with respect to one another, and a mouth switch assembly as described above which is displaceable relative to the base together with an ocular lens of the microscopy optics.

In a further preferred embodiment of a microscopy assembly as described above, the stand comprises at least two stand members displaceable relative to one another, and at least one brake for releasable blocking of a motion of the two stand members relative to one another, wherein the at least one brake is actuatable by the mouth switch assembly.

In this embodiment, the different actuating operations of positioning and releasing the at least one brake are enabled by the mouth switch assembly actuated by the user's mouth: By pressing together his lips, after having taken the mouth switch assembly between his teeth, the user actuates the actuator element and in this manner effects that the at least one of the joint brakes is released, so that he may—while keeping his lips pressed together—move the mouth piece, and therewith the microscopy optics rigidly connected to the mouth piece. By the releasing of the joint brake being effected by an actuating with the user's lips, and the positioning of the microscopy optics being effected by moving the mouth piece taken between the user's teeth, the user is enabled to select his desired view of the work field. As soon as the desired view of the work field is reached, he will release his teeth from the mouth piece, and only then effect, by releasing his lips, that the joint brakes block again, so that the desired view is accurately fixed.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

FIG. 11b shows a circle for comparison of the geometrical relations with a shape of the mouth piece as shown in FIG. 11a.

DETAILED DESCRIPTION OF EXEMPLARY EMBODIMENTS

Figure 1:
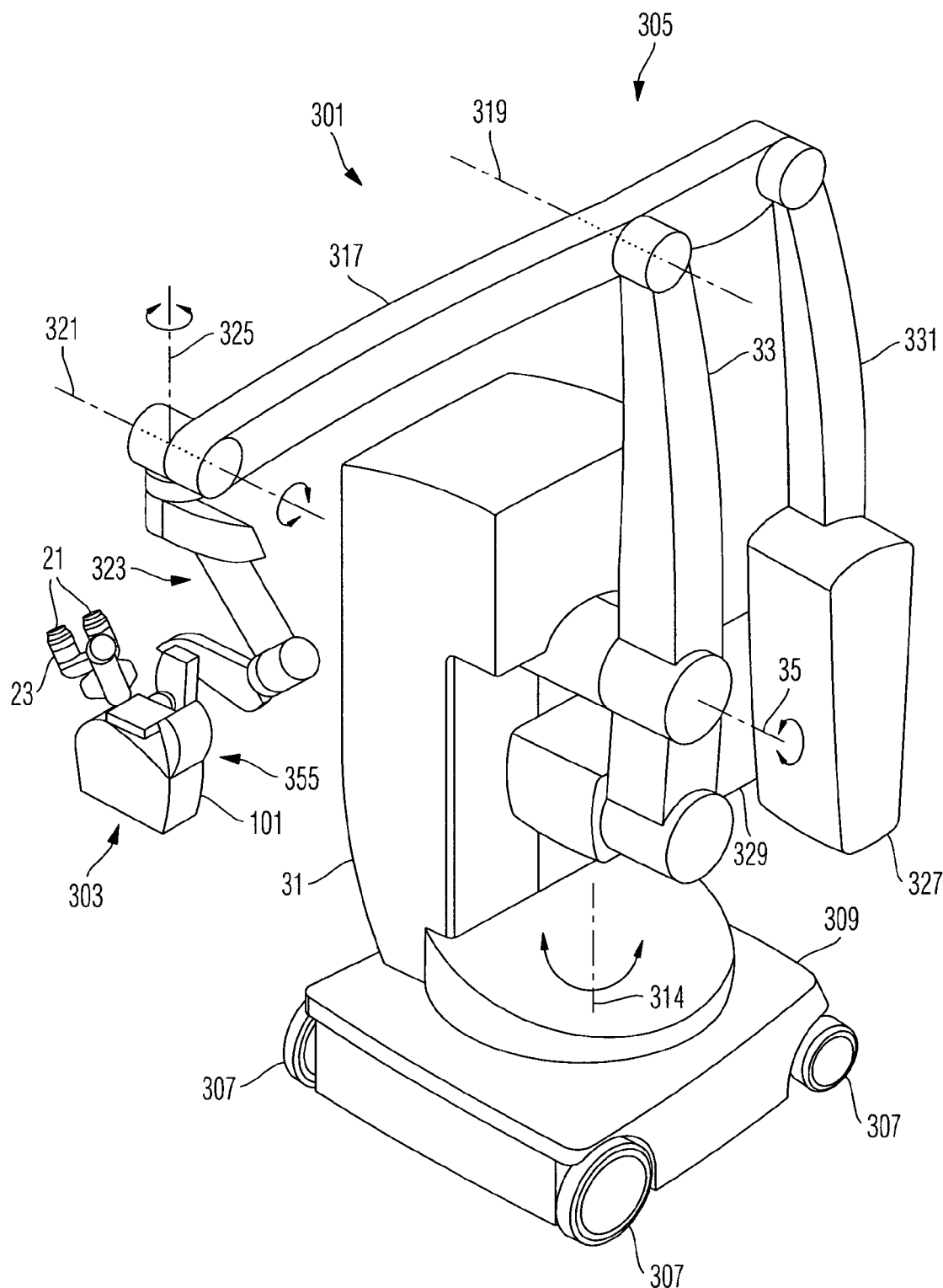
FIG. 1 shows a stereo microscope assembly with a stand in perspective view.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

The microscopy assembly 301 shown in perspective view in FIG. 1 comprises a stereo operation microscope 303 mounted on a stand 305. The stand 305 comprises a base 309 including wheels 307, on which base 309 a base part 31 is mounted rotatably about a vertical axis 314. On the base member 31, a stand arm 33 is mounted pivotably about a horizontal axis 35, and a further arm 317 is mounted pivotably about a further horizontal axis 319 on an upper end of the arm 33. At a front end of the arm 317, the microscope 303 is supported pivotably around a further horizontal axis 321 via intermediate members 323 which enable a rotation of the microscope 303 around a further vertical axis 325 and around further axes not shown in FIG. 1 for setting a viewing direction of the microscope.

The stand 305 enables balancing of the microscope 303, so that it is displaceable in space by the action of comparatively small forces. To this end, the stand 305 comprises a counter weight 327 coupled to the arms 33 and 317 via additional arms 329 and 331.

The microscope has a multi-part base 101 with a main body 355 (see FIG. 1), which inter alia accommodates an objective lens of the microscope optics and which is coupled to the stand 305. A tube 23 is coupled to the main body 355, which tube provides a basis for ocular lenses 21 of the microscope 303.

Figure 2:
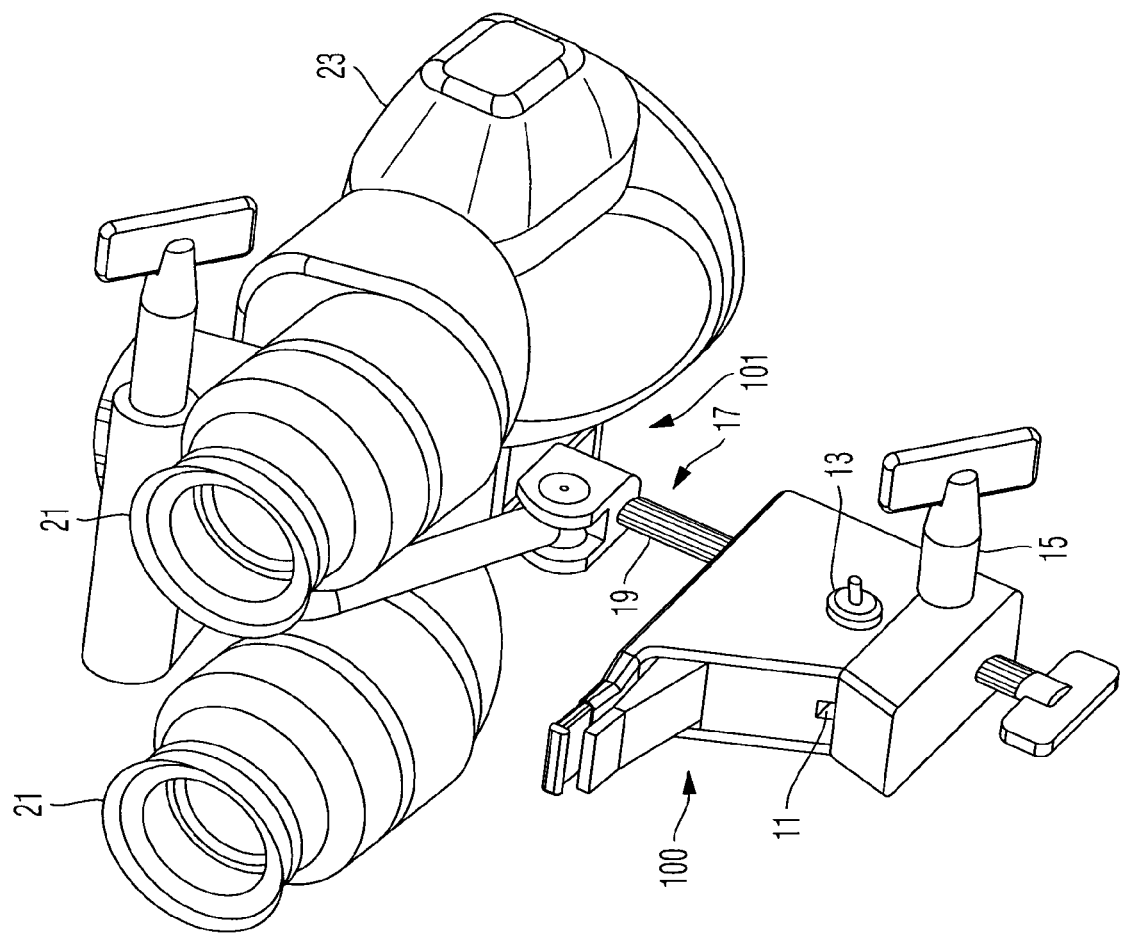
FIG. 2 shows a mouth switch assembly in an exemplary embodiment together with a tube and ocular lens of a microscope as shown in FIG. 1 in perspective view.

FIG. 2 shows, in perspective view, a mouth switch assembly 100 together with a tube 23 and an ocular lens 21 of a microscope as shown in FIG. 1. It is evident from FIG. 2 that the mouth switch assembly 100 is mounted to the tube 23 via a holder 17. The holder 17 comprises a rod 19, by which the mouth switch assembly 100 is longitudinally displaceably supported. The tube 23 thus forms a basis 101 for ocular lenses 21 of the microscope.

Figure 3:
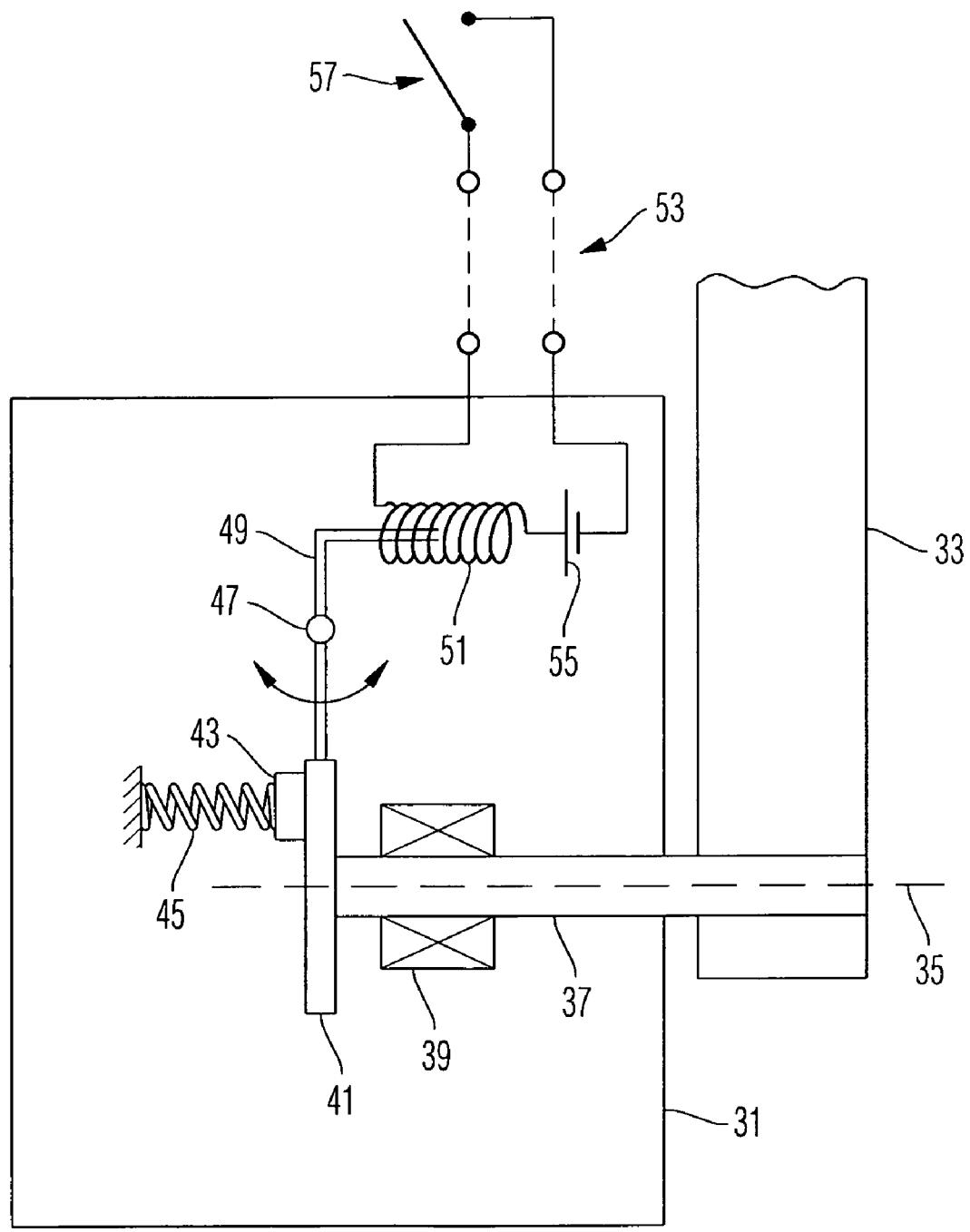
FIG. 3 shows a schematic view of a blocking of components of a stand of a microscope as shown in FIG. 1.

FIG. 3 schematically shows blocking of components of a stand of a microscope as shown in FIG. 1. In order to prevent any non-intentional displacing of the microscope in space, individual pivot axes, such as axis 35, are blocked against rotation of their components as shown in FIG. 3. In the base part 31 a bearing 39 is provided for a shaft 37 carrying the arm 33. At one end of the shaft 37, a brake disk 41 is mounted, in a rotationally fixed manner, against which disk a brake pad 43 is urged by a pressing spring 45. The brake pad is connected, in a rotationally fixed manner, to the base part 31. Thus, the brake pad 43 urged against the brake disk 41 prevents pivoting of the arm 33 relative to the base part 31.

The brake pad is connected to a lever 49 pivotable around an axis 47 such that the brake pad 43 may be lifted from contact with the disk 41 by pivoting the lever 49 around the axis 47. Such releasing of the brake pad 43 from the disk 41 is effected by the excitation of a magnet coil 51. To this end, a circuit 53 is closed, which comprises a power source 55 and a switch 57 arranged remotely from the base part 31, the switch being open in a non-actuated position. By actuating the switch 57, the current is caused to flow through the coil 51, same draws the lever 49 into such a position that the brake pad 43 is lifted from the disk 41, so that the arm 33 is free to be pivoted around the axis 35 relative to the base part 31.

Figure 4:
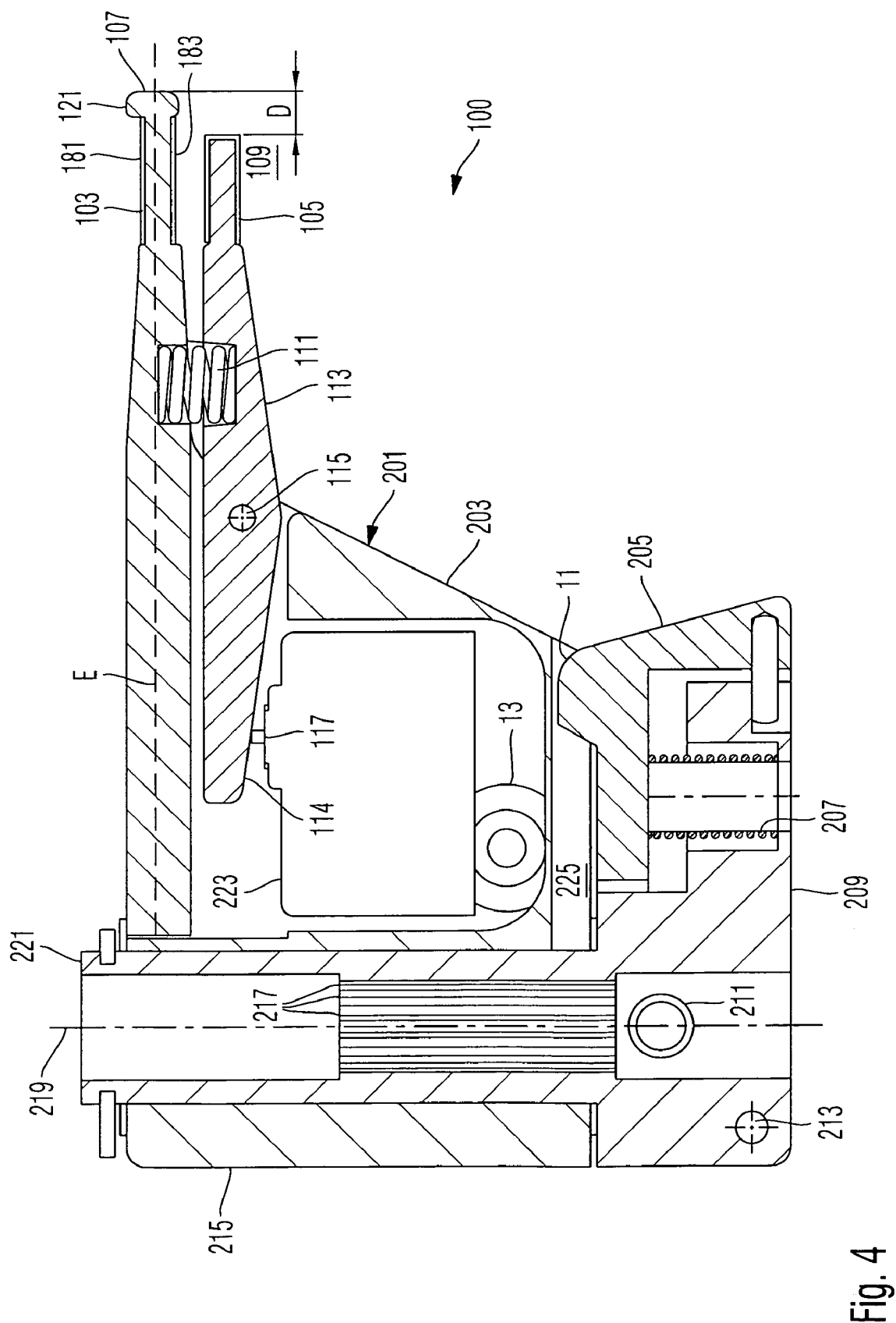
FIG. 4 shows a cross sectional view of the mouth switch assembly of FIG. 2.

FIG. 4 shows the mouth switch assembly 100 of FIG. 2 in cross section. A mouth piece 103 and an actuating element 105 are mounted to a mouth switch holder 201 of the mouth switch assembly 100. A force sensor comprising the actuating element 105 is actuatable by the user's lip, while the mouth piece 103 is gripped by the user's teeth. Herein, the actuating element 105 of the force sensor is arranged at a side 183 of the mouth piece 103. The mouth piece 103 and the actuating element 105 are arranged at a distance from one another and can be taken into the user's mouth together. The actuating element comprises an actuating area 109, i.e. a spatial area in which an actuating operation of the user is sensed by the actuating element. The actuating area 109 is spaced apart from the front end 107 of the mouth piece 103 by a distance D, said distance D being larger than 4 mm and smaller than 35 mm, and preferably being larger than 5 mm and smaller than 20 mm. In the embodiment described herein, the distance D is set to 7 mm. The mouth piece 103 is fastened to a mouth piece holder 201 of the mouth piece assembly 100.

Further, the mouth piece 103 has a flattened shape. This is achieved by manufacturing the mouth piece 103 such that it has, in an area between the front end 107 and the actuating area 109 located next to the front end 107 of the mouth piece 103, a maximum diameter of less than 40 mm, and in the area between the front end 107 and the actuating area 109 located next to the front end 107 of the mouth piece 103, has a circumference of less than 90 mm.

In a preferred embodiment, the actuating element 105 is realized as a pivoting lever 113 pivotable relative to the mouth piece 103. However, other embodiments are also provided, as explained below.

The actuating element 105 according to this embodiment is made pivotable around a pivoting axis 115 relative to the mouth piece 103 by a pivoting lever 113. The pivoting axis 115 of the pivoting lever 113 extends substantially perpendicularly to the longitudinal extension direction E of the mouth piece 103. A spring 111 is mounted with a bias between the mouth piece 103 and the actuating element 105, so that the actuating element 105 is elastically displaceable from its rest position relative to the mouth piece 103. Thus, in the rest position the actuating element 105 and the mouth piece 103 are held spaced apart. In the force sensor realized as described above, the spring may be realized as a spiral spring or as a leaf spring. Instead of a spring, any other construction element providing a restoring force may be used, such as, e.g., a rubber part or an air suspension element.

The user, by pressing together his lips, exerts a force onto the actuating element 105, so that the actuating element 105 pivots around the pivot axis 115 against the force of the spring 111 towards the mouth piece 103 at the front end. Herein, an opposed end 114 of the pivot lever 113 presses against a sensor 117 of a key switch 223 so as to close an electrical contact 57, so that, as explained above in conjunction with FIG. 3, at least one brake 41, 43, 45 is released.

Externally of the mouth switch assembly 100, a switch 13 is further provided for actuation by a hand of the user. The electrical contacts of the key switch 223 and the switch 13 are connected in series and together form the switch 57 of FIG. 3 for releasing the brakes of the stand. Thereby, the function of the mouth switch can be activated and de-activated, respectively, by the switch 13. When activated, the user can release the brakes of the stand by pressing together the mouth piece 103 with the actuating element 105, and can then exert a force onto the microscope via the mouth piece 103 for displacing same in space on the stand.

In this exemplary embodiment, a pivoting part 203 of a mouth switch holder 201 is made pivotable around an axis 219 of the mouth switch assembly 100 as explained below. Herein, an arresting part 209 of the mouth switch support 201 comprises a sleeve 221 having profile ribs 217 extending parallel to the axis 219 on an inner portion, and having a screw hole 211 extending transversely to the axis 219. The inner profile ribs 217 of the sleeve 221 engage with profile ribs provided externally on the rod 19 of the holder 17 for blocking a rotation of the sleeve 221 around the central axis 219 of the rod 19. Into the screw hole 211, a fastening screw 15 is screwed, which, when tightened, prevents displacing the sleeve 221 in the longitudinal direction of the rod 19, such that thereby, the arresting part 209 is locked on the rod 19.

The mouth switch holder 201 further includes the pivoting part 203 with a sleeve 215 surrounding the sleeve 221 of the arresting part 209, so that the pivoting part 203 is pivotable around the axis 219.

A grip 205 is pivotable around an axis 213 extending transversely to the axis 219 and carries a rib 11, which in the embodiment shown in FIG. 4 engages with a groove 225 of the pivoting part 203. The rib 11 engaging in the groove 225 of the pivoting part 203 prevents pivoting of the pivoting part 203 with respect to the arresting part 209, such that the mouth piece 103 and the actuating element 105 of the mouth switch assembly mounted on the pivoting part 203 are arranged in a rotationally fixed manner on the rod 19 in the actuating position of the mouth switch support 201 shown in FIG. 3.

The user can, with his hand, pivot the grip 205 against the force of a spring 207 around the axis 213 for disengaging the rib 11 from the groove 225. In this disengaged state, the pivoting part 203 of the mouth switch support 201 is pivotable relative to the arresting part 209 of the mouth switch support 201, so that the mouth piece 103 and the actuating element 105 can be pivoted around the rod 19 for removing them from the actuating position near the oculars 21 (compare FIG. 2).

Figure 5:
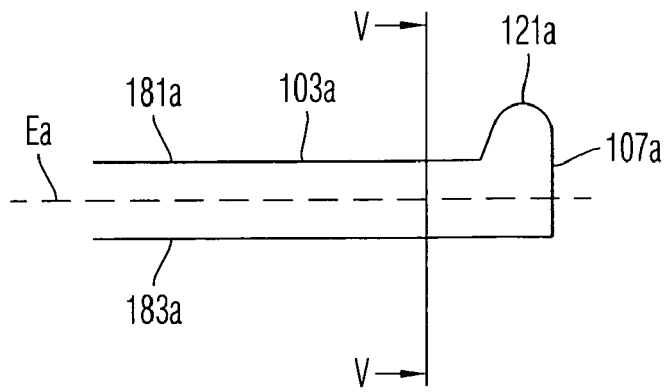
FIGS. 5 to 8 show various embodiments of a mouth piece of a mouth switch assembly.

In a realization of the mouth piece 103 of an embodiment of the mouth switch assembly as shown in FIG. 5, a beaded rim 121a protruding from at least one surface 181a of the mouth piece 103a is provided at a front end 107a of the mouth piece 103a. This beaded rim 121a enables the user to securely draw the mouth piece 103a towards himself. Moreover, the shaping of the beaded rim ensures that a user's saliva remains in the user's mouth, so that no unwanted flow of liquid along the mouth piece 103a can occur and also, that dripping is limited. Further, this Figure shows an underside 183a of the mouth piece 103.

It is understood that equal reference numerals denote equal components, wherein in further embodiments, different characters are appended to the reference numerals.

Figure 6:
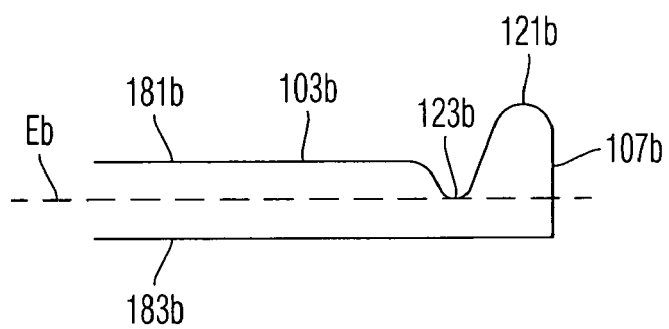

In a further realization of the mouth piece as shown in FIG. 6, a notch 123b extending transversely to a longitudinal extension direction Eb of the mouth piece 103b may be provided on an upperside 181b of the mouth piece 103b. Thereby, an unintentional slipping of the user's teeth is prevented or at least, the danger of slipping is reduced. A further advantage of the notch is that the user can push the mouth piece 103b away from himself in a securely held relation.

Figure 7:
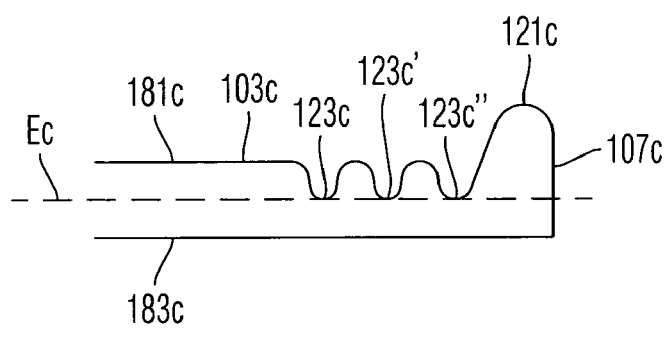

Moreover, plural notches 123c, 123c', 123c" may be provided of the mouth piece 103c as shown in FIG. 7. In this manner, individual features of the user's teeth (overbite, underbite etc.) are accounted for. The plurality of notches is not limited to three, but there may be provided more or fewer than three. Further, the user can select, depending on his momentary position, an advantageous one of the notches 123c', 123c", 123c'" for secure gripping with his teeth.

Figure 8:
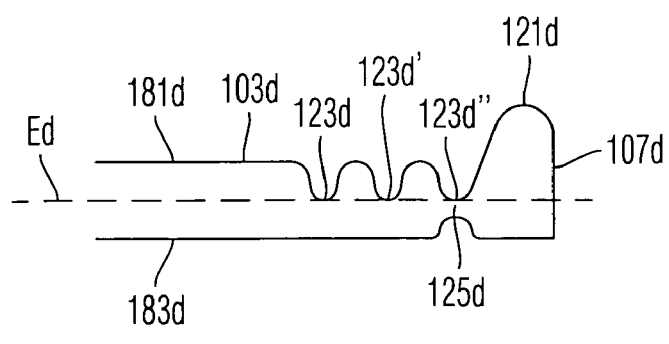

FIG. 8 shows a realization of a mouth piece 103d where notches 123d and 125d are provided as well on an upper side 181d as on an underside 183d.

Figure 9:
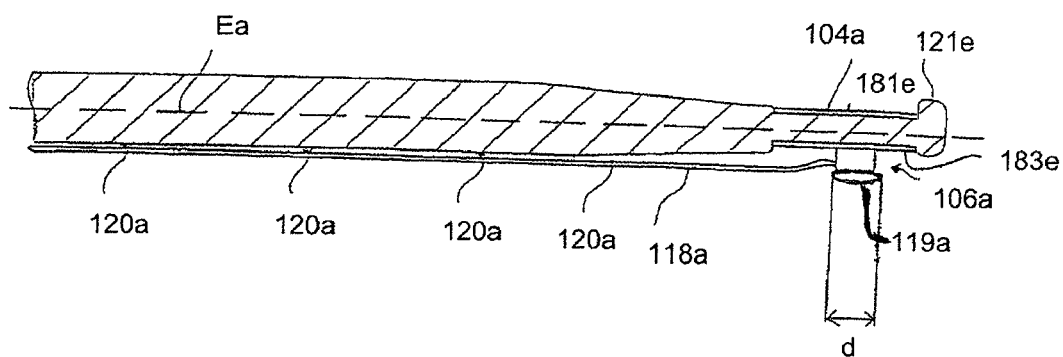
FIG. 9 shows, in a partial view, a cross sectional view of an embodiment of a mouth piece together with an actuating element of an embodiment of the mouth switch assembly, wherein the actuating element is mounted directly on the mouth piece.

The inventive mouth switch assembly is not limited to embodiments in which the force sensor is realized by way of a pivoting lever. As exemplarily shown in FIG. 9, the actuating element 106a of the force sensor is directly attached to the mouth piece 104a. The actuating element is further realized as a sensor 119a, but may as well be realized as a mechanical pressure sensor. Preferably, same extends over a dimension of less than 10 mm in a longitudinal extension direction of the mouth piece. In an alternative embodiment, a piezoelectric sensor or some other type of contact switch is provided, such as a contact switch with double contacts, in which contacting effects an increased conductivity, or an inductive approach switch provided with a simple contact area, or similar, known contact switches.

By means of a signal conducting line 118a connected via plural fastening points 120a to the mouth piece 104a, a detecting of an actuating of the actuating element is transmitted to a control such as the circuit 53 shown in FIG. 3.

Figure 10:
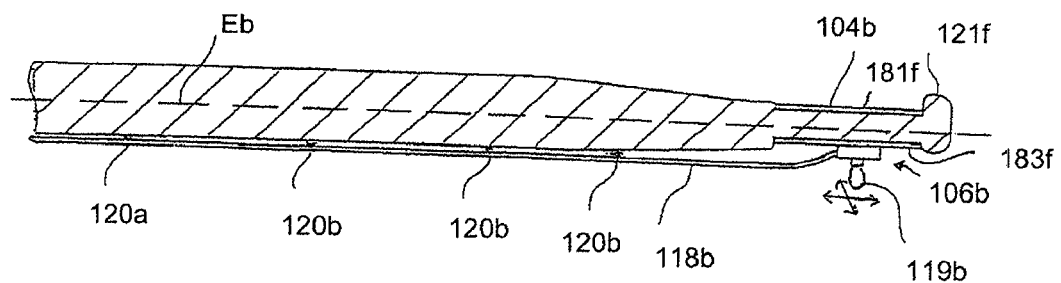
FIG. 10 shows, in a partial view, a cross sectional view of an embodiment of a mouth piece together with an actuating element of an embodiment of the mouth switch assembly, wherein an actuating element in the form of a lever is mounted directly on the mouth piece.

In an alternative embodiment, a lever actuatable in plural directions is provided in place of the sensor shown in FIG. 10. The fine motor skills of the lip permit e.g. to sway the lever 119b in the longitudinal extension direction Eb of the mouth piece 104b, and in a direction transverse to the longitudinal extension direction Eb, so that four switching options are realized.

Figure 11A:
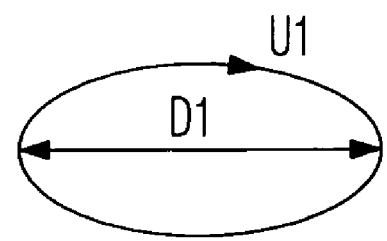
FIG. 11a shows a cross sectional view of the mouth piece shown in FIG. 5, taken along the line V-V.
Figure 11B:
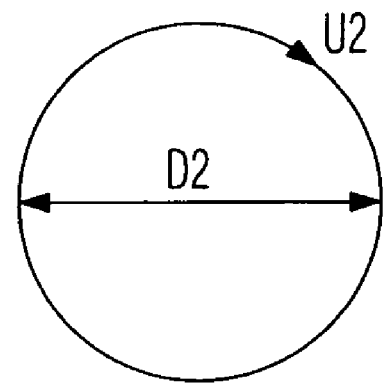

FIG. 11a shows a cross sectional view along line V-V of the mouth piece 103a shown in FIG. 5, for elucidating the shape of mouth piece 103a described above as flattened. Herein, reference is made to mouth piece 103a, however it is understood that the following explanations with respect to the shape of the mouth piece pertain to any realization thereof. For comparison, FIG. 11b shows a circle with a diameter D1 for explaining the geometrical relations of the flattened shape of the mouth piece. Because the largest diameter D1 of the mouth piece 103a shall be smaller than 40 mm, as described above, an according circle with said diameter of 40 mm would have a circumference of U2=pi*40 mm=125.6 mm, as shown schematically in FIG. 11b. By the limitation of the circumference U1 of the mouth piece 103a to a mere 90 mm it is ensured that the mouth piece 103a is flat shaped, as shown in FIG. 11a, and that thereby it can readily be taken into the mouth, so that the user is easily enabled to control the actuation.

In the examples described above, the mouth switch assembly serves releasing a blocking of a pivoting of the stand of the microscope. Alternatively, it is also possible to employ the mouth switch for other purposes, such as switching on and off an additional illumination, changing an operating mode of the microscope, such as an operating mode of a display of data coupled into the beam path of the microscope and so on.

For example, the actuating element may be realized by a lever pivotable in plural directions instead of the pivoting lever or sensor. By means of a user's very finely motorically controllable lips, several operations can then be initiated.

Further, it is also possible to provide the mouth switch assembly at other devices than at a microscopy assembly.

According to an embodiment, a microscopy assembly comprises a stand and a stereo microscope carried by the stand, the microscope including a mouth switch assembly held by a support and including a mouth piece grippable by a user's teeth. The mouth piece comprises a force sensor actuatable by the exertion of pressure through a user's lip, while the mouth piece is held by the user's teeth, wherein the force sensor comprises an actuating element arranged at a side of the mouth piece, and wherein an actuating area of the actuating element located next to a front end of the mouth piece has a distance from the front end of the mouth piece which is larger than 4 mm and smaller than 35 mm.

According to embodiments, a microscopy assembly comprises a stand, a stereo microscope supported by the stand, and a mouth switch assembly mounted to a holder, the mouth switch assembly including a mouth piece grippable by a user's teeth, and with a force sensor actuatable by the exertion of pressure by a user's lip while the mouth piece is held by the user's teeth, the force sensor including an actuating element arranged at a side of the mouth piece, wherein an actuating area of the actuating element located next to a front end of the mouth piece is spaced apart from the front end of the mouth piece by a distance larger than 4 mm and smaller than 35 mm.

While the invention has been described with respect to certain exemplary embodiments thereof, it is evident that many alternatives, modifications and variations will be apparent to those skilled in the art. Accordingly, the exemplary embodiments of the invention as set forth herein are intended to be illustrative and not limiting in any way. Various changes may be made without departing from the spirit and scope of the present invention as defined in the following claims.

What is claimed is:

1. A mouth switch assembly, comprising:
   a holder for mounting the mouth switch assembly to a base,
   a mouth piece mounted on the holder, wherein the mouth piece is grippable by a user's teeth,
   a force sensor actuatable by exertion of pressure by means of a user's lip while the mouth piece is gripped by the user's teeth,
   wherein the force sensor includes an actuating element arranged at a side of the mouth piece,
   wherein an actuating area of the actuating element located next to a front end of the mouth piece is spaced apart from the front end of the mouth piece by a distance larger than 4 mm and smaller than 35 mm.

2. The mouth switch assembly according to claim 1, wherein the mouth piece, in an area between the front end and the actuating area next to the front end of the mouth piece, has a maximum diameter of less than 40 mm.

3. The mouth switch assembly according to claim 1, wherein the mouth piece, in an area between the front end and the actuating area next to the front end of the mouth piece, has a circumference of less than 90 mm.

4. The mouth switch assembly according to claim 1, wherein the distance of the actuating area from the front end of the mouth piece is larger than 5 mm and less than 20 mm.

5. The mouth switch assembly according to claim 1, wherein a beaded rim is provided at the front end of the mouth piece, said rim protruding laterally from the mouth piece.

6. The mouth switch assembly according to claim 1, wherein a notch is provided at the front end of the mouth piece, said notch extending transversely to a longitudinal extension direction of the mouth piece.

7. The mouth switch assembly according to claim 1, wherein the actuating element is elastically displaceable from a rest position of said actuating element relative to the mouth piece.

8. The mouth switch assembly according to claim 7, wherein the force sensor comprises a spring for holding the actuating element elastically in its rest position.

9. The mouth switch assembly according to claim 7, wherein the actuating element is a pivoting lever pivotable with respect to the mouth piece.

10. The mouth switch assembly according to claim 9, wherein a pivoting axis of the pivoting lever extends substantially perpendicularly to a longitudinal extension direction of the mouth piece.

11. The mouth switch assembly according to claim 9, wherein the force sensor comprises an electrical switch actuated by the pivot lever.

12. The mouth switch assembly according to claim 1, wherein the actuating element is mounted to the mouth piece.

13. The mouth switch assembly according to claim 12, wherein the actuating element comprises a sensor extending along less than 10 mm in a longitudinal extension direction of the mouth piece.

14. The mouth switch assembly according to claim 13, wherein the sensor is a mechanical pressure sensor.

15. A microscopy assembly, comprising:
a stand with a base,
a microscopy optics supported by the stand and displaceable relative to the base, and
a mouth piece assembly according to claim 1, which is displaceable relative to the base together with the microscopy optics.

16. The microscopy assembly according to claim 15, wherein the stand comprises at least two stand members displaceable relative to one another, and at least one brake for releasably blocking a movement of the at least two stand members relative to one another, the at least one brake actuatable by the mouth switch assembly.

* * * * *